United States Patent [19]

Lundsgaard

[11] Patent Number: 4,879,190
[45] Date of Patent: Nov. 7, 1989

[54] ELECTROCHEMICAL CELL

[75] Inventor: Jorgen S. Lundsgaard, Svendborg, Denmark

[73] Assignee: MHB Joint Venture, Dayton, Ohio

[21] Appl. No.: 238,071

[22] Filed: Aug. 30, 1988

[51] Int. Cl.⁴ ............................................. H01M 6/10
[52] U.S. Cl. .................................... 429/94; 429/131; 429/192; 29/623.3
[58] Field of Search ................ 429/192, 191, 94, 131; 29/623.3

[56] References Cited

U.S. PATENT DOCUMENTS

| 2,954,417 | 9/1960 | Lehovec et al. | 429/94 |
| 3,350,239 | 10/1967 | Stanimirovitch | 29/623.3 |
| 4,471,037 | 9/1984 | Bannister | 429/191 |
| 4,547,440 | 10/1985 | Hooper et al. | 429/192 |
| 4,589,197 | 5/1986 | North | 429/192 |
| 4,594,299 | 6/1986 | Cook et al. | 29/623.3 |
| 4,792,504 | 12/1988 | Schwab et al. | 429/192 |
| 4,794,059 | 12/1988 | Hope et al. | 429/192 |

Primary Examiner—Donald L. Walton
Attorney, Agent, or Firm—Smith & Schnacke

[57] ABSTRACT

An electrochemical cell comprising a relatively thin strip of anode material, first and second electrolyte layers coated on the opposing surfaces of the anode strip, first and second relatively thin strips of cathode material contacting the first and second electrolyte layers, thereby forming a laminate strip with the electrolyte layers and anode strip and a single cathode current conductor strip. The laminate strip is deformed such that both of the first and second strips of cathode material contact the single cathode current conductor strip along substantially the entire length thereof. In one embodiment, the cell takes the form of a spiral, in which the conductor strip is superposed to the laminate strip and the combination is rolled lengthwise, and in another embodiment, the cell takes the form of a stack in which the laminate strip is fan-folded and the conductor strip is fan-folded and inserted between the folds of the laminate strip such that the corners of the folds of the laminate strip are perpendicular to the corners of the folds of the conductor strip.

21 Claims, 3 Drawing Sheets

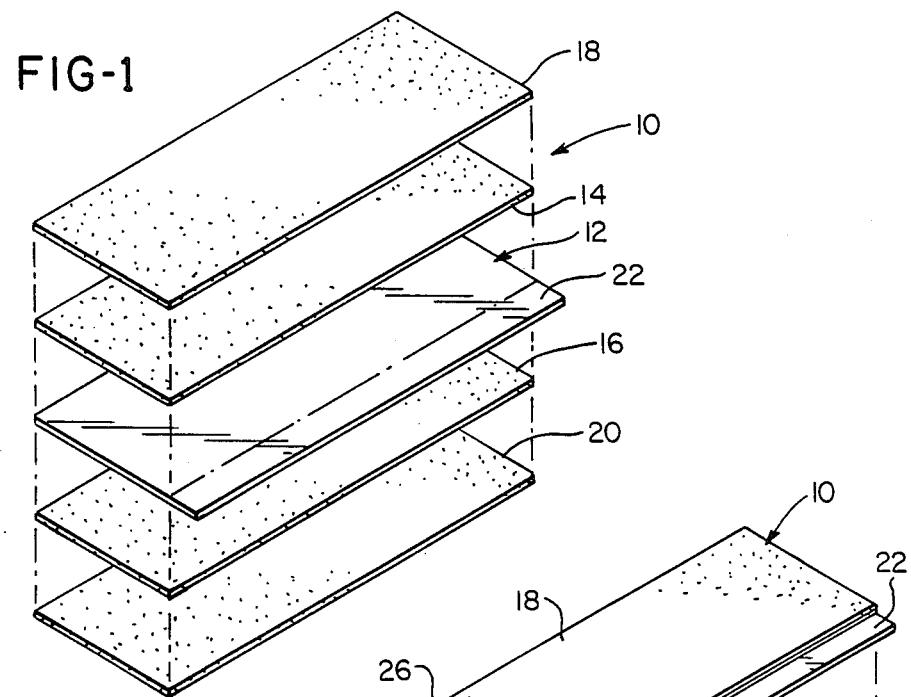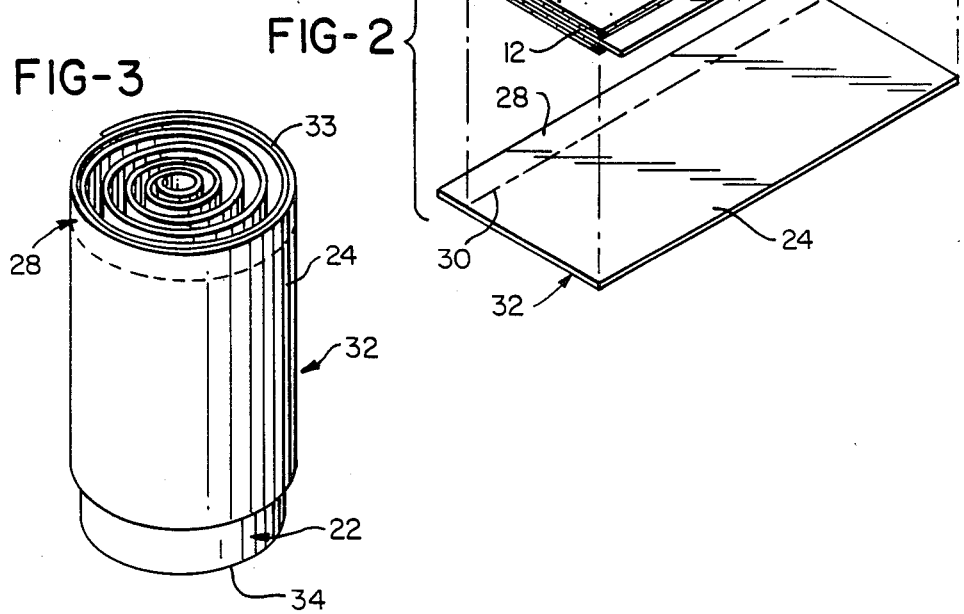

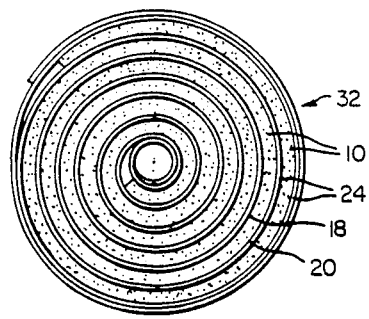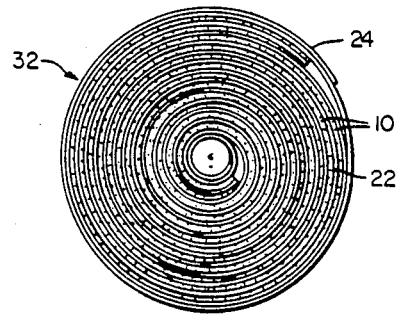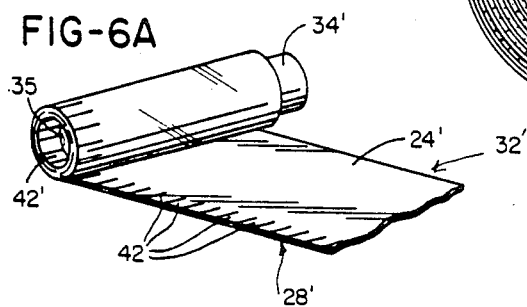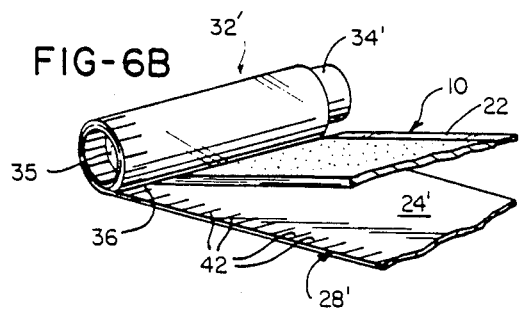

ELECTROCHEMICAL CELLs

BACKGROUND OF THE INVENTION

The present invention relates to electrochemical cells and, more particularly, to nonaqueous cells utilizing a polymer electrolyte.

Solid-state cells having a lithium anode, a finely-divided metal oxide cathode and a polymer electrolyte possess many advantages over other types of electrochemical cells. For example, such cells provide a long useful service life, possess a relatively high power density, a relatively high specific energy—on the order of 200 to 300 Wh/kg—and a relatively high specific power—on the order of 600 W/kg. Such cells are also desirable in that their polymer-based electrolyte component can be readily and inexpensively formed with greatly reduced thickness, and the entire cell can be shaped in a number of desirable configurations thereby making the cell useful in a wide variety of applications.

An example of such a cell is disclosed in the publication *Advanced Battery Development*, published in 1984. That cell comprises a lithium foil anode, a cathode of finely divided vanadium oxide with carbon black additions mixed with electrolyte material, termed a "composite electrode," and an electrolyte comprising an ion-conducting polymer consisting of poly(ethylene oxide) complexed with the lithium salt $LiCF_3SO_3$ deposited in a thin layer on a nickel foil.

A laminate, comprising elongate strips of anode material, polymer electrolyte, cathode material and current conductor layers is formed into a cell by folding the laminate in a "fan-folded" or "concertina" configuration. However, in the fan-folded configuration disclosed, the stacked segments of the laminate overlie each other such that the segments of current conductor contact each other and the segments of anode material contact each other on successive segments of the fanfolded laminate.

In another embodiment, a cell comprises a spiral or "jelly roll" configuration in which a laminate comprising a strip of insulator material, a strip of anode material, a strip of polymer electrolyte, a strip of composite cathode material and a strip of current collector are wound into a spiral shape. Successive windings of the aforementioned laminate are isolated from each other by the strip insulator segment of the laminate.

Another battery cell construction is disclosed in the article "The Magic of MOLI" in the June 1987 issue of QST. That cell includes a molybdenum disulfide cathode, a polymer electrolyte and a lithium anode. A laminate comprising an anode sandwiched between two electrode layers which, in turn, contact two cathode layers is wound in jelly-roll fashion and encased in a steel can to form the cell. Strips of metal foil extend transversely of the anode and cathode layers and are connected to the negative and positive electrodes, respectively, of the resulting battery.

However, the aforementioned cell designs possess some disadvantages. For example, the lithium/vanadium oxide cell designs disclosed show a single cathode laminated to each anode strip, and a single current conductor for each cathode. Consequently, a portion of the anode strip opposite the electrolyte layer is largely unused and adds unnecessarily to the cost, weight, and thickness of the resultant cell. It is not currently practicable to manufacture lithium anode strips which are sufficiently thin to overcome this disadvantage.

The disadvantage with the MOLI cell is that each cathode requires its own current conductor, again adding to the overall weight thickness and cost of the resultant cell. Accordingly, a need exists for a lithium battery which is relatively inexpensive to manufacture, is efficient in operation in that it uses substantially the entire anode strip and is light in construction.

SUMMARY OF THE INVENTION

The present invention is an electrochemical secondary cell of the lithium/vanadium oxide type in which a laminate comprising the anode, two layers of polymer electrolyte and two layers of cathode material is formed such that a single current conductor strip contacts both layers of cathode material. In one embodiment, a single cathode current conductor strip is superposed to a laminate strip comprising a single anode strip sandwiched between two electrolyte layers and two cathode strips, and the combination is wound into a spiral. As a result of the spiral winding, the single cathode conductor strip contacts both cathode layers and therefore serves a double duty.

In a second embodiment, the aforementioned cell laminate is fan-folded into a stack having a plurality of laminate sections. The cathode conductor strip is also fanfolded into a stack which is interleaved between the folded segments of the laminate strip and oriented such that the folds of the conductor strip are at right angles to the folds of the laminate strip. With both embodiments, the cathode conductor strip may be provided with tabs protruding sidewardly from a longitudinal edge of the strip and spaced along its length. Similarly, the lithium anode may be provided with a protruding strip of metal foil, such as nickel, which extends from a side of the anode strip opposite that of the cathode tabs. The resultant structures are fitted with positive and negative electrodes which are made of a conductive material and attached to the appropriate set of tabs.

In a preferred method of fabricating the spiral or jelly-roll cell, a mandrel of nonconducting material is connected to the leading edge of a strip of metallic foil, and the foil is wound about the mandrel. Simultaneously, a strip of cell laminate is inserted into the nip of the roll of foil. As the foil strip continues to be wound about the mandrel, it forms the cathode current conductor strip with the cell laminate as well as a protective casing.

Accordingly, it is an object of the present invention to provide a cell laminate and current conductor strip structure in which a cathode current conductor in the form of a single strip contacts both cathode layers of a laminate cell having cathode strips positioned to interact with opposing sides of an anode strip; a cell laminate and cathode current conductor which can be folded or deformed into a compact structure; a cell laminate and cathode current collector combination which is lightweight, thin, and relatively easy to manufacture; and a cell laminate and cathode current collector which comprises a lithium cell having a high power density.

Other objects and advantages of the invention will be apparent from the following description, the appended claims and the accompanying drawings.

BRIEF DESCRIPTION OF THE DRAWINGS

FIG. 1 is an exploded perspective view of the cell laminate strip of the present invention;

FIG. 2 is an exploded perspective view of the cell laminate of FIG. 1 superposed to a current collector strip and including an anode current collector strip;

FIG. 3 is a perspective view of a spiral or "jellyroll" configuration of the cell shown in FIG. 2;

FIG. 4 is an end view of the cell of FIG. 3;

FIG. 5 is an opposite end view of the cell of FIG. 3;

FIGS. 6(A) and 6(B) are perspective views showing the formation of a preferred embodiment of a cell of the present invention utilizing the laminate of FIG. 1;

DETAILED DESCRIPTION OF THE PREFERRED EMBODIMENTS

Figure 6C:
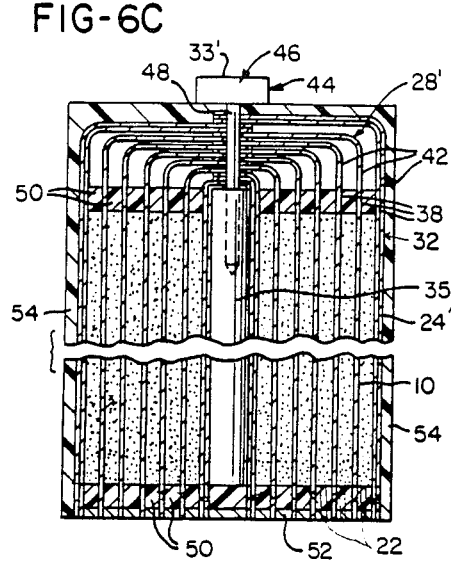
FIG. 6(C) is a side elevation, in section, of the cell formed in FIGS. 6(A) and 6(B)

As shown in FIG. 1, the electrochemical cell of the present invention includes a cell laminate, generally designated 10, which comprises an anode strip 12, first and second layers of polymer electrolyte 14, 16, respectively, and first and second cathode strips 18, 20, respectively. In the preferred embodiment, the cell laminate 10 comprises a portion of a second cell having an alkali metal foil anode with a thickness of about 75 microns, an ionically conducting polymeric electrolyte layer containing an ionizable alkali metal salt with a thickness of about 25 microns and an intercalation cathode layer of a finely divided transition metal oxide with a thickness of about 75 microns.

In a particularly effective embodiment, the anode strip 12 comprises a lithium foil and the cathode strips comprise a composite of finely divided vanadium oxide ($V_6O_{13}$), carbon black or an electronically conductive polymer and solid electrolyte material. The polymer electrolyte 14, 16 preferably comprises a lithium salt, such as $LiCF_3SO_3$, dissolved in poly(ethylene oxide), PEO. Alternatively, the active cathode component may comprise metal chalcogenides such as $NbSe_3$, $V_2O_5$, $MnO_2$, $TiS_2$ or electronically conducting organic polymers such as polypyrrole and polyacetylene. Both the electrolyte layers 14, 16 and the cathode strips 18, 20 may be coated onto the anode strip 12 by the "doctor blade" continuous casting, solvent evaporation technique or by extrusion.

Although element 10 in FIGS. 1 and 2 is referred to as a cell laminate, it should be noted that there are in face two "cells" in the strict sense of the term, each having a cathode in an ion exchange relation with an anode. However, in the electrochemical cell shown in the figures, the two cathode layers are always joined by a single current conductor.

As shown in FIGS. 1 and 2, the cell laminate 10 preferably includes an anode current collector strip 22 which is embedded in the anode strip 12 along a longitudinal edge thereof and extends sidewardly therefrom. Appropriate materials for the strip 22 are nickel, copper other conductive metals, conductive polymers and metal-coated polymers. The cell laminate 10 is superposed to and is joined to a cathode current conductor strip 24, which is sized to protrude sidewardly beyond the longitudinal edge 26 of the cell laminate 10 opposite the edge containing the anode current conductor strip 22. The protruding portion 28 is separated from the remainder of the cathode conductor strip 24 by a broken line 30 for purposes of illustration. An appropriate material for the strip 24 is aluminum, other conductive metals, polymers and metal-coated polymers.

When placed in position as shown in FIG. 2, the cell laminate 10 and cathode strip 22, which together comprise a cell 32, are preferably rolled lengthwise to form a "jelly-roll" or spiral configuration, as shown in FIGS. 3, 4 and 5. With this configuration, the single cathode current conductor strip 24 is able to contact both cathode strips 18, 20 along substantially their entire lengths and therefore conduct current from both cells to the positive electrode of the associated battery.

The protruding part 28 of the cathode strip 24 provides a convenient positive electrode 33 at one end of the cell 32, and the anode conductor strip 22 protrudes from the opposite end of the cell to provide a negative electrode 34.

As shown in FIGS. 3–5, it is also preferable to fabricate the cathode conductor strip 24 so that it is longer in length than the cell laminate 10. Consequently, the cathode conductor strip 24 forms an outer protective covering for the cell 32 when formed into the spiral shown in the figures.

As shown in FIGS. 6(A)–6(C), an alternate spiral cell structure 32' may be fabricated utilizing a cylindrical mandrel 35 made of a nonconductive material such as nylon. To form the spiral cell 32', the cathode conductor strip 24' is attached at an end to the mandrel 35 and wound in a spiral about it. The cell laminate 10, with a protruding anode strip 22, is inserted into the nip 36 and the cathode conductor strip 24' continues to be wound around the mandrel 35 so that the cell laminate 10 itself forms a spiral in between the windings of the cathode conductor strip.

Again, it is preferable that the cathode conductor strip 24' be longer in length than the cell laminate 10 so that the finished product, shown in FIG. 6(C), includes an outer protective covering of metal. Once the cathode conductor strip 24' has been wound about the mandrel 35, and the cell laminate 10, the resulting structure includes protruding positive and negative electrodes 33', 34' respectively.

A more conventional positive electrode is formed by slitting the protruding portion 28' of the cathode conductor strip 24' into a plurality of tabs 42, then folding the tabs radially inwardly and connecting them to a button 44 made of a conductive material such as nickel and having a cylindrical head 46 and shank 48. The shank 48 is attached to the ends of the tabs 42 and secured within the mandrel 35. The head 46 then becomes the positive electrode 33' of the cell 32'.

The opposite end of the cell 32' includes a spiral of protruding end 22 in which the windings are sealed and separated by an insulating polymer 50. A layer of conducting polymer 52 is applied to form a flat negative electrode surface. Similarly, the windings of the cathode are sealed and separated by an insulating polymer 50. The cell is encased in a jacket 54 made of a nonconductive polymer.

Figure 8:
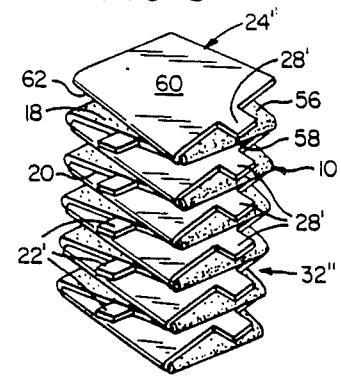
FIG. 8 is a perspective view of an assembled cell utilizing the embodiment of FIG. 7.
Figure 7:
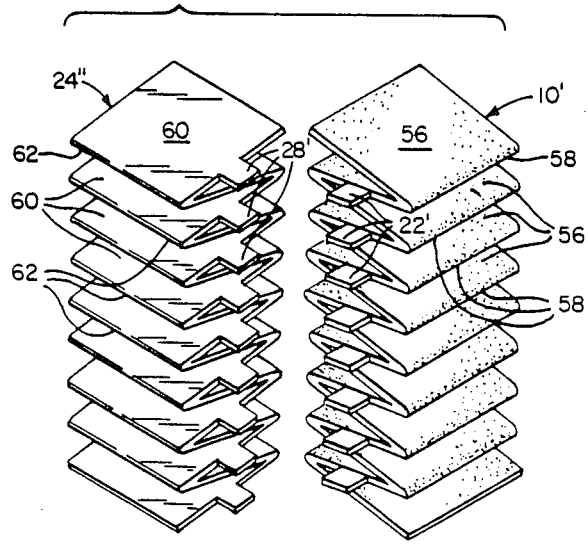
FIG. 7 is an exploded, perspective view of a second preferred embodiment incorporating the cell laminate of FIG. 1.

An alternate design of the cell 32" is shown in FIGS. 7 and 8. In FIG. 7, the cell laminate 10' is fanfolded along its length, thereby forming a series of segments 56 joined by creases 58. The anode conductor strip has been modified to form a series of protruding tabs 22' extending along one longitudinal side of the cell laminate 10', and spaced to extend from every second segment 56.

Similarly, the cathode conductor strip 24" is fan-folded to form a plurality of segments 60 in which every other segment has a protruding tab 28'. Sequential segments 60 are joined by creases 62.

As shown in FIG. 8, the cell 32" is formed by interleaving the segments 60 of the cathode conductor strip 24' with the segments 56 of the cell laminated 10'. Consequently, the cathode conductor strip 24" contacts both faces of each segment 56 of the cell laminate 10' and therefore contacts the surfaces of both cathode strips 18, 20 substantially along their entire lengths.

The resultant structure is substantially in the form of a cube. The creases 58 of the cell laminate 10' are oriented at right angles to the creases 62 of the cathode conductor strip 24, and the tabs 22' of the anode strip 12 are longitudinally aligned with each other, as are the tabs 28' of the cathode conductor strip. Accordingly, the anode and cathode tabs 22', 28', respectively, may be joined together to form the negative and positive electrodes of the resultant cell 32".

While the forms of apparatus herein described constitute preferred embodiments of this invention, it is to be understood that the invention is not limited to these precise forms of apparatus, and that changes may be made therein without departing from the scope of the invention.

What is claimed is:

1. An electrochemical cell comprising:
   a relatively thin strip of anode material having flat opposing surfaces;
   first and second electrolyte layers coated on said opposing surfaces;
   first and second relatively thin strips of cathode material superposed to said first and second electrolyte layers, respectively, thereby forming a cell laminate with said electrolyte layers and said anode strip;
   a cathode current conductor strip; and
   said cell laminate being deformed such that both said first and second strips of cathode material contact said cathode current conductor strip along substantially the entire lengths of said strips of cathode material.

2. The cell of claim 1 wherein said cell laminate and said cathode current conductor strip are superposed to each other and are rolled to form a spiral.

3. The cell of claim 1 wherein said cell laminate is fan-folded lengthwise to form a plurality of segments arranged in a stack, and in which said cathode current conductor strip is fan-folded to form a plurality of segments arranged in a stack which intersects said fan-folded cell laminate stack such that creases of said folded strip of current conductor are positioned at right angles to creases of said folded laminate strip and each intermediate segment of said folded current conductor strip extends between adjacent segments of said cathode material of said folded cell laminate.

4. The cell of claim 3 wherein said strip of anode material includes a plurality of conductive tabs spaced along and protruding outwardly from a longitudinal edge thereof and positioned such that when said strips of anode and cathode materials are deformed, said tabs extend therefrom in a common direction.

5. The cell of claim 4 wherein said cathode current conductor strip includes a plurality of conductive tabs spaced along and protruding outwardly from a longitudinal edge thereof and positioned such that, when said strips of anode and cathode materials and said current conductor strip are deformed, said tabs of said current conductor strip extend therefrom in a common direction different that said direction of said anode material tabs.

6. The cell of claim 5 wherein said tabs of said strip of anode material and said current conductor strip each extend only from every other segment thereof.

7. The cell of claim 6 wherein said tabs of said strip of anode material and said current conductor strip each extend from common edges thereof.

8. The cell of claim 1 further comprising a mandrel made of a nonconductive material; said cathode current conductor strip being attached proximate an end thereof and wound about said mandrel in a spiral; and said laminate being wound about said mandrel in a spiral positioned between windings of said cathode current conductor strip.

9. The cell of claim 8 wherein said anode strip includes sidewardly projecting means for forming a current conductor therefor.

10. The cell of claim 9 wherein said sidewardly projecting means includes common connector means for forming a negative electrode of said cell.

11. The cell of claim 10 wherein said common connector means comprises a metallic pin inserted in an end of said mandrel and connected to said sidewardly projecting means.

12. The cell of claim 11 wherein said cathode current conductor strip includes a longitudinally extending portion protruding sidewardly therefrom beyond said laminate in a direction opposite said sidewardly projecting means of said anode strip.

13. The cell of claim 8 wherein said cathode current conductor strip has sufficient length to form an outer covering of said spiral and thereby enclose said laminate strip.

14. The cell of claim 1 wherein said strip of anode material comprises a strip of lithium foil; said electrolyte layer comprises a lithium salt dissolved in poly(ethylene oxide); and said strip of cathode material comprises a composite of finely divided vanadium oxide, carbon black and solid electrolyte material.

15. The cell of claim 1 futher comprising a polymer coating encapsulating said laminate strip and said cathode current conductor strip.

16. An electrochemical cell comprising:
   a laminate strip including a strip of anode material having flat opposing surfaces, first and second electrolyte layers coated on said opposing surfaces and first and second relatively thin strips of cathode material contiguous with said first and second electrolyte layers, respectively;
   a cathode current conductor strip; and
   said laminate strip and said cathode current conductor strip being formed into concentric spirals whereby said laminate strip is positioned between windings of said cathode current conductor strip spiral and both said first and second strips of cathode material are contiguous with said cathode current conductor strip along substantially their entire lengths.

17. An electrochemical cell comprising:
   a laminate strip including a strip of anode material having flat opposing surfaces, first and second electrolyte layers coated on said opposing surfaces, first and second relatively thin strips of cathode material contiguous with said first and second electrolyte layers, respectively, said laminate strip being fan-folded lengthwise to form a plurality of segments arranged in a stack, and a cathode current conductor strip being fanfolded to form a plurality of segments arranged in a stack and intersecting said stack of fan-folded laminate strip such that creases of said fan-folded strip of current conductor are positioned at right angles to creases of said folded laminate strip, and each intermediate segment of said folded current conductor strip extends between adjacent segments of said cathode material of said folded laminate strip.

18. A method for forming an electrochemical cell comprising the steps of:
 (a) selecting a relatively thin strip of anode material having flat, opposing surfaces;
 (b) coating first and second electrolyte layers on said opposing surfaces;
 (c) attaching first and second relatively thin strips of cathode material to said first and second electrolyte layers, respectively, thereby forming a laminate strip with said electrolyte layers and said anode strip;
 (d) attaching a single cathode current conductor strip to a nonconductive, elongate mandrel
 (e) winding said conductor strip about said mandrel in a spiral; and
 (f) simultaneously with step (e), inserting an end of said laminate strip in a nip of said spiral and winding said laminate in a spiral to be concentric with and in between windings of said conductor strip.

19. An electrochemical cell comprising:
 a mandrel made of a nonconducting material;
 a cathode current conductor strip wound in a spiral about said mandrel and being shaped to have a portion protrude beyond an end of each of said mandrel;
 a cell laminate including an anode strip, first and second electrolyte layers coated on opposing surfaces of said anode strip, and first and second cathode strips superposed to said first and second electrolyte layers, respectively, said anode strip having a protruding portion made of a conductive material extending sidewardly therefrom; and
 said cell laminate being formed in a spiral and positioned between windings of said anode strip such that said protruding position thereof extends sidewardly beyond an opposite end of said mandrel, whereby protruding portions of said cathode current conductor strip and said anode strip form positive and negative electrodes, respectively, of said cell.

20. The cell of claim 19 wherein said protruding portions of said cathode current conductor strip include a plurality of transverse slits forming tabs therebetween, said tabs being folded radially inwardly; and said cell further comprises a button connecting said tabs to form a positive electrode.

21. The cell of claim 20 wherein said button includes a head and a shank extending into said mandrel.

* * * * *